Figure 1:
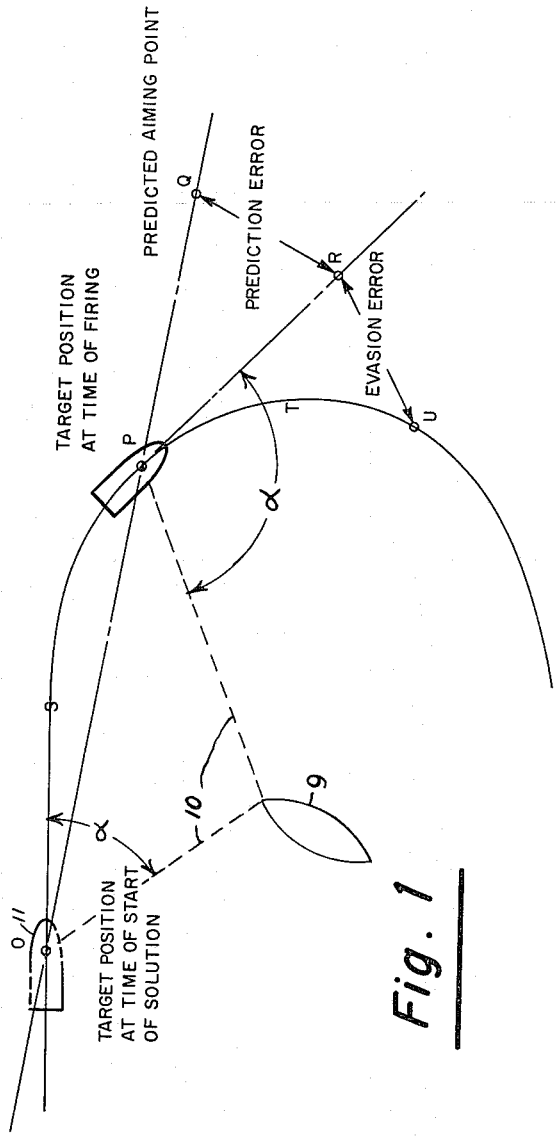

INVENTOR.
KENNETH J. FRIEDENTHAL

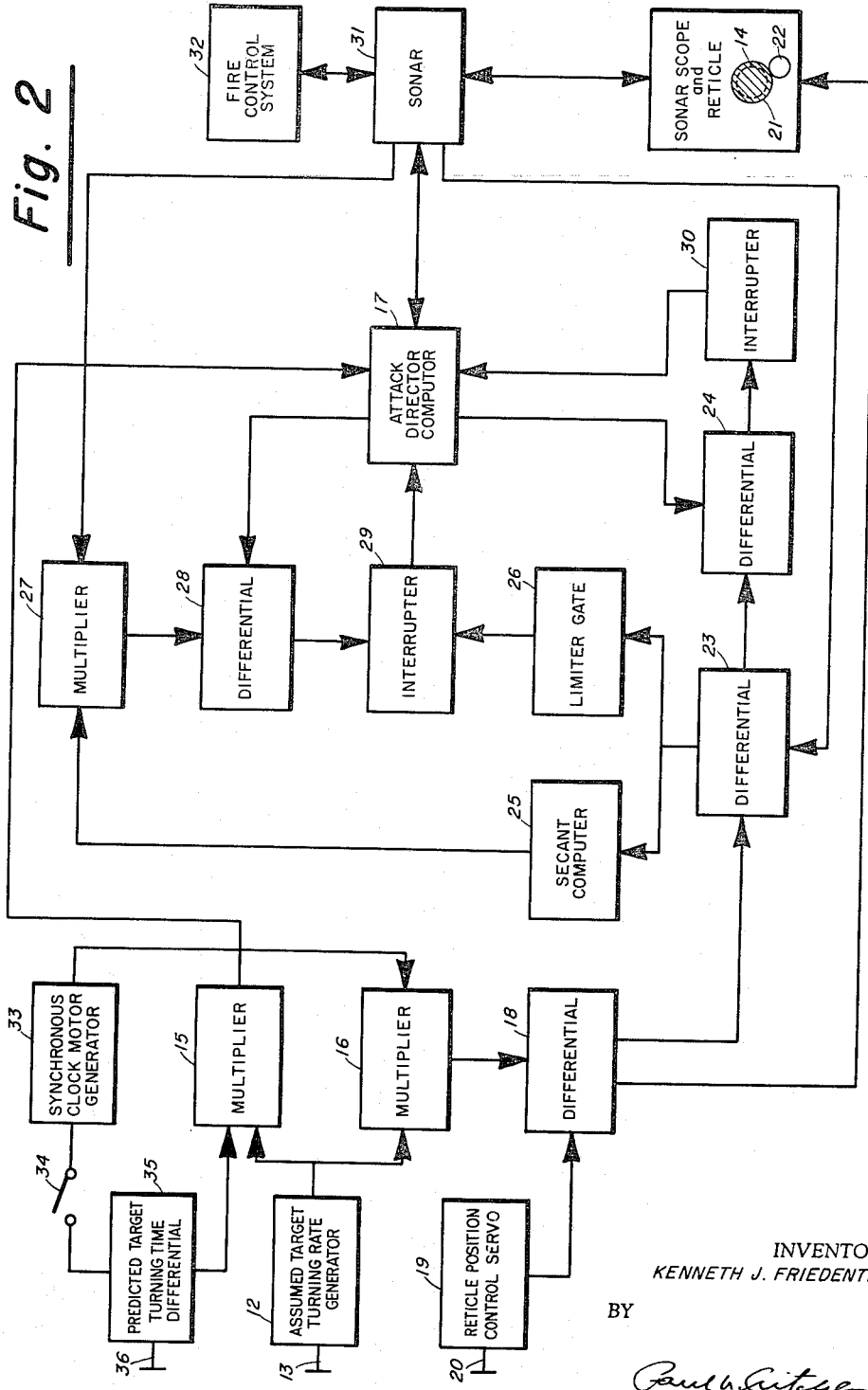

3,028,077
ASPECT-DOPPLER SONAR SYSTEM

Kenneth J. Friedenthal, San Diego, Calif., assignor to the United States of America as represented by the Secretary of the Navy
Filed Apr. 24, 1959, Ser. No. 808,855
10 Claims. (Cl. 235—61.5)
(Granted under Title 35, U.S. Code (1952), sec. 266)

The invention described herein may be manufactured and used by or for the Government of the United States of America for governmental purposes without the payment of any royalties thereon or therefor.

This invention relates generally to underwater object detection systems and in particular to a sonar system incorporating target aspect parameters to facilitate predicting and determining the bearing, range, speed and instantaneous direction of travel of submerged moving targets for navigational and fire control purposes. Although it is of especial utility in subaqueous sound echo-ranging systems of the type described herein, it should be obvious that the principles of the invention are equally applicable to and may be employed in conjunction with other forms of wave energy operating within other appropriate fluid media.

To fully appreciate the difference between this system and those of the prior art, it should be noteworthy that no known sonar type apparatus makes use of target aspect information in arriving at operational solutions to the aforementioned navigational and fire control problems. Therefore, one of the difficulties with the presently known echo-ranging systems is that considerable time is required to ascertain or predict the direction of travel a target will take during an evasive action because its aspect angle is not taken into consideration at any given time during the attack thereon. For the purpose of this disclosure, term the aspect angle or aspect may be defined as the angle between the longitudinal axis of the target vessel and the sonar beam incident thereon measured in a horizontal plane. Thus, it can be seen that if this angle is known it can be properly correlated with information obtained by a sonar system in such manner that an operator may more easily anticipate the target direction of travel and position at some given future instant, inasmuch as the number and amount of corrections that must be made due to target evasive action will be materially reduced, and since the initial heading of the target vessel will be known at the time of initial detection even though it may or may not be moving at that instant. Although the preferred embodiment of this invention is manually manipulated in conjunction with a sonar system in order to provide maximum flexibility of operation of the combination, it should be understood that it may be incorporated therewith for automatic operation which, in turn, by-passes or obviates the need for an operator for this purpose.

It is, therefore, the main object of this invention to increase the effectiveness of a sonar-attack director-fire control system by providing significant improvement in the probability of target destruction.

Another object of this invention is to provide a sonar system with target aspect information for navigation purposes.

A further object of this invention is to provide an improved anti-submarine attack system.

Still another object of this invention is to provide an attachment for introducing target aspect angle data from a sonar system into a fire control system.

Another object of this invention is to provide a target angle aspect incorporation attachment which is easy to operate and requires a minimum of operator training.

Another object of this invention is to provide a device which reduces the operational time between the detection of a target and the prediction of its course of evasive action.

A further object of this invention is to provide a means for predicting the probable position of a moving target at the time of effective impact from an ordnance missile.

Another object of this invention is to provide a device which will facilitate the evasive action of an approaching missile.

Last but not least, it is an object of this invention to provide an attachment which will incorporate target aspect data in conventional sonar-attack director-fire control systems.

Other objects and many of the attendant advantages of this invention will be readily appreciated as the same becomes better understood by reference to the following detailed description when considered in conjunction with the accompanying drawing in which like reference numerals designate like parts throughout the figures thereof and wherein:

FIG. 1 illustrates the problem to be solved and the effect of using target aspect information to solve same; and FIG. 2 shows the aspects-Doppler sonar system in block diagram form.

In the problem arrangement shown in FIG. 1, an attack vessel 9 is depicted as projecting echo-ranging signals 10 for sonar tracking a moving target 11 as it travels along the solid line path OPU between positions O and P. Thus, if it is assumed that the attacking vessel's fire control system including the attack director computer and sonar apparatus begins to solve the trajectory problem at point O, before the solution is completed the target will have moved. As a general rule, the target will be maneuvering in such manner that an attack is difficult. Consequently, by the time the solution to the trajectory problem is completed, the target would have made an evasive turn along path S. And without providing further corrections to the solution of said problem, either during or after its initial completion, missing the target would result. But if the rate of turning of the target can be estimated from observing continuously the target aspect angle $\alpha$ along with target speed and range, the position of the target at some subsequent time can be anticipated more accurately and more quickly. In other words, if the rate of change of the targets aspect angle is determined and fed into a fire control computer, target position prediction errors at the time the ordnance is aimed and fired are reduced. Of course, deviation from constant change in target aspect due to target evasive action would probably exist as a normal operating condition, but this change would be observed at all times by the operator and manual or automatic corrections instantly made as compensation therefor.

Hence, it can be seen that firing the ordnance when the target is at position P without considering target aspect angle would result in using an incorrect predicted aiming point Q, since it would not be known whether the target arrived at position P from position O via path S or the straight path represented by line OPK. However, with inclusion of aspect in the aiming computations, the corrected predicted aiming point R can be used, resulting in substantial reduction in prediction error. Because this is a continuous process involving a time element and because this time element allows the target to continue its evasive tactics, said target will probably continue traveling some path T perhaps to position U after the ordnance has been fired. This, of course, results in an evasion error, but, at the same time, this evasion error is considerably reduced if the prediction error is reduced. Therefore, the probability of placing the ordnance in a lethal area is improved and will increase the odds of target destruction.

Referring now to FIG. 2, an arrangement of elements, each of which in themselves alone is conventional, is shown in concerted form to provide a new combination as well as a device which produces a novel, useful, and desirable result. The circuit illustrated by the block diagrams thereof comprises a manually operable assumed target turning rate generator 12 having an adjustment knob 13 which is set by the operator as he observes the time for the target to make an evasive turn on a sonar display scope 14 and which produces an output signal proportional thereto. This signal is fed into first and second multipliers 15 and 16 where it is converted and passed on to an attack director computer 17 such as the Librascope Mark V and a first differential 18, respectively. Also connected to said first differential is a manual reticle control servo 19 having an adjustment knob 20 which is likewise set by the operator as he observes said sonar scope to position a rotatable reticle 21 mounted in front of the face thereof. Thus, it can be seen that said reticle can be rotated by a driving mechanism 22 which is, in turn, actuated through said first differential by either knob 13 or knob 20, the latter being adjusted in order to position the reticle lines parallel to the longitudinal axis of the displayed target or along the target course at any time before the target starts its turning evasive action, and the former being adjusted to position the reticle lines parallel to the longitudinal axis of the target at any instant after target turning starts.

In addition, the output from said first differential is coupled to a second differential 23 where it is modified appropriately by a target bearing signal from a sonar apparatus to produce a signal that is representative of target aspect angle. This signal is then simultaneously fed to a third differential 24, a secant computer 25, and a limit gate 26. The secant computer converts target aspect angle to a signal representing its secant which is then coupled to a multiplier 27 to effect modification of a signal, obtained from Doppler via said sonar apparatus, which is proportional to the vector component of target speed that is parallel to the sonar sound beam. The resulting output signal represents target speed. It is coupled to a fourth differential 28 along with an input signal representing target speed as computed by the aforementioned attack director computer without benefit of target aspect considerations to produce an output signal which is proportional to the target speed correction necessary to provide greater accuracy in computation of actual target speed for trajectory purposes. This correction signal is fed back to the attack director through an interrupter 29.

Since the secant of an angle of 90° or 270° is infinite, the secant computer cannot reproduce a signal which is a practical functional representation thereof at these values. Hence, the corrected target speed cannot be computed where such angles occur between the longitudinal axis of the target and the sonar beam. Therefore, the limit gate energized by aspect signals from said second differential disconnects said feedback target speed correction signals from said attack director via the interrupter when said aspect angles are within a predetermined range on either side of 90° and 270°.

In order to provide the aforementioned attack director computer with target angle correction information, the aforesaid second differential output is applied to the third differential 24 where it is appropriately combined with the target angle signal which was produced by said attack director without benefit of aspect considerations. The output of said third differential thus represents feedback target angle correction signals which may be applied at the discretion of the operator to the attack director computer through a manually operable interrupter 30 where they may be further employed for navigation and trajectory purposes in conjunction with a Doppler sonar apparatus 31 and a fire control servo system 32 associated therewith.

In order to reduce the time required to make corrections of reticle position at the face of the sonar scope, it was found to be desirable to include an automatic approximating apparatus within the subject system combination which enables the reticle to be continuously moved at a rate and in a direction which is substantially proportional to the time required for the target to make its turn during any given instant of its evasive tactics. This is accomplished by connecting a timing device such as a synchronous clock motor generator 33 through a disconnect unit 34 to a predicted target turning time differential 35 having a knob 36 for manual adjustment thereof. The output of said differential is proportional to the time for the target to make its evasive turn once it has deviated from its original course. This time, of course, is predicted by the operator watching the sonar display scope. Said output is then applied to said first multiplier 15 where it is combined with the output signal turning rate generator 12 and transformed into a signal representing predicted target angle change which, in turn, is fed into the attack director computer.

The synchronous clock motor generator output is also connected to the aforementioned second multiplier 16 where it is combined with the assumed target turning rate signal to produce a signal that continues on through said first differential 18 to ultimately drive the drive mechanism 22 which rotates the reticle about an axis passing through the center of the sonar display scope face and normal thereto.

From the foregoing description of the structure depicted in FIG. 2, it is seen that three signals representing three corrections are applied to a Doppler sonar type fire control system as a result of incorporating target aspect therein. They are as follows: (1) Target speed correction; (2) target angle correction; and (3) predicted target angle change. The inclusion of these factors along with the many other factors considered in conventional Doppler sonar-attack director fire control systems results in improved target attack tactics.

Briefly, the operation of the subject invention involves an operator who watches a sonar display scope. When a target is detected, its basic heading is determined from sonar Doppler. As soon as an acceptable display of target aspect is available at the display scope, the operator initially aligns the reticle with the aspect presentation using the manual reticle control servo adjustment knob. Once so aligned, any target aspect changes can be observed. If the target is observed to go into a turn, the operator inserts an assumed course rate by adjusting the control knob of the assumed target turning rate generator. If the course rate set in is incorrect, the reticle lines will diverge from the target's heading. The operator will then correct the rate course and reposition the reticle and, thus, approach the true course rate. The true value of the target course will, therefore, be continuously inserted into the attack director computer.

The operator also inserts a target turning prediction time which is combined with the assumed course rate to obtain a predicted target angle change which is applied to the attack director computer for target course correction purposes.

The proper selection of the aforementioned settings by the operator ultimately results in a signal representing target aspect angle. This signal is then converted into feedback signals which make appropriate navigation corrections. Thus, it can be seen that the information obtained by the operator from the sonar display scope can be incorporated into the attack director computer to improve the accuracy thereof.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. An aspect-Doppler sonar system comprising means for displaying the aspect angle of a moving target, rotatable reticle means contiguously disposed in front of said display means adapted to be aligned with said displayed target aspect angle, means connected to said reticle means for rotating same and continuously maintaining parallel alignment between said reticle and the aforesaid displayed target aspect angle during changes thereof, and means connected to said reticle rotating means for producing an output signal which is indicative of the position and direction of travel of said moving target when said alignment is effected.

2. The device of claim 1 wherein said means connected to said reticle means for rotating same and continuously maintaining parallel alignment between said reticle and the aforesaid displayed target aspect angle during changes thereof includes a manual reticle control servo and a differential connected between said servo and said reticle means.

3. The apparatus of claim 1 wherein said means connected to said reticle means for rotating same and continuously maintaining parallel alignment between said reticle and the aforesaid displayed target aspect angle during changes thereof includes a manually operable assumed target turning rate generator, a synchronous clock motor generator, a multiplier connected to simultaneously receive the output of said assumed target turning rate generator and said synchronous clock motor generator to produce an output signal proportional to the product thereof, and a differential connected to receive said multiplier output signal and rotate said reticle.

4. The apparatus of claim 3 further including a manual reticle control servo connected to said reticle means through said differential, whereby said reticle means may be actuated by the output signals of said multiplier and said manual reticle control servo separately and independently and in concert depending on operational requirements.

5. A Doppler sonar aspect system comprising means for determining the aspect angle of a moving target, display means connected to said target aspect angle determining means for indicating same, means alignable with said target aspect angle indication for producing signals proportional thereto, and means responsive to said last mentioned signals for computing the predicted position and course of said moving target.

6. A sonar aspect system comprising means for determining speed and bearing of a target, means connected to said determining means for producing output signals which are representative of said target speed and target bearing at any given instant, means for producing signals proportional to the aspect angle of said target, and feedback means responsive to said last mentioned signals for modifying said target speed and bearing representative signals therewith, whereby the position of said target may be more quickly and accurately predicted during an evasive tactical maneuver.

7. The sonar aspect system of claim 6 wherein said means for determining speed, bearing, and aspect angle of a target includes a Doppler sonar apparatus.

8. The sonar aspect system of claim 6 wherein said means connected to said determining means for producing output signals which are representative of said target speed and target bearing at any given instant include an attack director computer.

9. A target aspect attachment for a Doppler sonar system operating in conjunction with an attack director computer comprising a sonar display means having a face for visually indicating the position, speed, course, and aspect angle of a moving target at any given instant, a reticle contiguously disposed parallel to said face and rotatable about an axis passing through the center thereof, means connected to said reticle for rotating same for parallel alignment thereof with the aforesaid moving target aspect angle at any given instant, means coupled to said reticle rotating means for producing a signal representative of said target aspect angle when said reticle is in parallel alignment therewith, and means for applying the last mentioned signal to the aforesaid attack director computer when said target angle is within a predetermined angular range on either side of 90° and 270°.

10. In an aspect-Doppler sonar system, a sonar display means having a face for visually indicating the direction of travel of a moving target at any given instant, transparent means mounted in front of said face for rotation about an axis normal thereto and passing through the center thereof, reticle means disposed on said transparent means for parallel alignment with the direction of travel of said target, means connected to said transparent means for rotating same for parallel alignment of said reticle with the direction of travel of said target at any given instant, and means coupled to said rotating means for producing a signal proportional to the aspect angle of said target when said reticle is aligned parallel with the direction of travel thereof.

References Cited in the file of this patent
UNITED STATES PATENTS

| | | |
|---|---|---|
| 2,858,533 | Richmond | Oct. 28, 1958 |
| 2,878,466 | Shank | Mar. 17, 1959 |
| 2,879,502 | Miller | Mar. 24, 1959 |